United States Patent Office 3,151,103
Patented Sept. 29, 1964

3,151,103
BULK POLYMERIZATION OF VINYL CHLORIDE WITH METALLIC OXIDES AND HYDROXIDES
Joseph Heckmaier, Hans Bauer, and Anton Möschle, all of Burghausen, Upper Bavaria, Germany, assignors to Wacker-Chemie G.m.b.H., Munich, Germany, a firm of Germany
No Drawing. Filed July 25, 1961, Ser. No. 126,515
Claims priority, application Germany, July 28, 1960, W 28,264
7 Claims. (Cl. 260—92.8)

Methods have already been known according to which fine-grained polymers can be obtained by bulk polymerization of vinyl chloride and mixtures of vinyl chloride with other monomers copolymerizable therewith in which the polymers obtained therefrom are insoluble. Such methods employ movable autoclaves containing freely movable indifferent bodies, such as balls or rods.

It has now unexpectedly been found that in such methods the grain size of the polymers can be controlled by carrying out the polymerization in the presence of oxygen compounds of metals belonging to the second, third and fourth groups of the Periodic System which are solid at the reaction temperature, said compounds belonging to the group consisting of the oxides and hydroxides of these metals.

The oxides or hydroxides added according to the invention are maintained in the product after polymerization. It has been found that by adding these oxides or hydroxides according to the invention the electrical properties of the products obtained are substantially improved over those of the previously known bulk polymers. Thus, for instance, the value of the electrical specific resistance of the polymer is more than tripled after carrying out polymerization in the presence of 0.5 percent by weight of CaO. Therefore, the polymers obtained according to the invention are excellently suited as insulating compositions for electrical conductors.

The particle size of the oxides or hydroxides to be used, with the exception of fumed silica, is preferably between 50 and 150 microns.

The oxides or hydroxides are used in an amount of from 0.01 to 5 percent by weight, preferably between 0.1 and 3 percent by weight, based on the monomers.

Examples of oxides or hydroxides that can be used according to the invention are: MgO, CaO, SrO, BaO, $Al_2O_3$, $SiO_2$, $TiO_2$, $ZrO_2$, $SnO_2$, $Ca(OH)_2$ and $Al(OH)_3$.

All other conditions and measures are those conventionally employed in the previously known methods for the bulk polymerization of vinyl chloride.

Any polymerization catalysts generally used in bulk polymerization methods, i.e. organic peroxides such as dilauroyl peroxide, benzoyl peroxide or other organic radical formers, such as azo compounds in which both azo N atoms are connected with a tertiary carbon atom the other valences of which are saturated by nitrile, carboxyalkyl, cycloalkylene, alkyl or alkyl-OOC radicals, or radiation rich in energy, such as ultraviolet light, can, of course, also be used to an extent which is usual for bulk polymerization processes.

The reaction temperature preferably ranges between 30 and 70° C.

The reaction vessel used is an autoclave containing indifferent movable bodies, such as balls or rods, in order to maintain the masses to be polymerized in a flowing condition. A polymerization device of this kind is described in detail in German Patent No. 950,814.

The tubular autoclave can be moved either by rotating it about its ends or by rotating it about its longitudinal axis.

Equally as has been described in German Patent No. 950,814 for the bulk polymerization of vinyl chloride alone or admixed with other monomers, one can, of course, also in the method of this invention employ, if desired, a small amount, preferably 0.1 to 5 percent by weight, of a diluent which is at least partially miscible with the monomer, but does neither dissolve nor tend to swell the polymer. Examples of such diluents are alcohols, such as methanol, and hydrocarbons, such as propane, butane, petroleum ether.

Examples of monomers that can be copolymerized with vinyl chloride are vinylidene chloride and vinyl esters, such as vinyl acetate. The proportion of vinyl chloride should amount to at least 80 percent by weight of the monomers employed.

In order to further illustrate this invention but without being limited thereto, the following examples are given:

Example 1

In a tube consisting of $V_2A$ steel and having a length of 9.84 inches (25 cm.) and a diameter of 2.75 inches (7 cm.), which tube contains three metal balls having a diameter of 1.18 inches (3 cm.) and is rotated about its ends in a constant temperature bath, 130 grams of vinyl chloride are polymerized at a temperature of 50° C. in the presence of 0.5 percent by weight, based on the monomer, of CaO having a particle size of 90 microns, with 130 mg. of dilauroyl peroxide as the catalyst. The obtained polymer exhibits a grain passage through a 0.20 mm. sieve of 60%, whereas in the absence of CaO the proportion of such superfine grain is only 45%.

The specific electrical resistance of a molded plate made of 140 grams of polyvinyl chloride obtained according to the above-described method, 60 grams of dioctyl phthalate and 2.8 grams of lead stearate after 24 hours of immersion in water at 20° C. and subsequent immersion in water at 60° C. amounts to $456 \times 10^9$ ohm cm., whereas a bulk polymer prepared without the addition of CaO has a specific electrical resistance of only $125 \times 10^9$ ohm cm.

Example 2

The method of Example 1 was repeated with the exception that instead of CaO 1 percent by weight of magnesium oxide having a particle size of 120 microns was added. The grain passage through the 0.2 mm. sieve in connection with the thus obtained product was 67 percent, the specific electrical resistance under the conditions described in Example 1 amounted to $533 \times 10^9$ ohm cm.

Example 3

The method of Example 1 was repeated with the exception that instead of CaO 1 percent by weight of aluminum hydroxide having a particle size of 60 microns was used as the additive. Compared to a control test without $Al(OH)_3$, the grain passage through the 0.2 mm. sieve is about 50% higher.

Example 4

The additive used in this test was 1 percent by weight of a fumed silica having a particle size of 0.015 micron and being commercially available under the trade mark "Aerosil." The product thus obtained has a grain passage through a 0.2 mm. sieve which is by 40% higher than that of a polymer prepared without such additive.

The preceding specific embodiments are illustrative of the invention. They are not to be deemed, however, as limitative and other expedients known to the art may be employed without departing from the body of the invention and the scope of the appended claims.

We claim:
1. In the process for bulk polymerization of vinyl monomers selected from the group consisting of vinyl chloride and mixtures of at least 80% vinyl chloride with other monomers copolymerizable therewith wherein the copolymers obtained are insoluble, under anhydrous conditions, in the presence of a polymerization catalyst, said process being carried out by means of movable autoclaves containing freely movable indifferent bodies, the improvement which consists in carrying out said polymerization in contact with from 0.01% to 5% by weight, based on said monomers, of oxygen compounds of metals selected from the group consisting of oxides and hydroxides of magnesium, calcium, strontium, barium, aluminum, silicon, titanium, zirconium and tin which are solid at the reaction temperature, said oxygen compounds of metals having an average particle size of less than 150 microns.

2. Process according to claim 1 wherein the oxygen compounds of the metals have an average particle size between 50 and 150 microns.

3. The process of claim 1 wherein said oxygen compound of metals is calcium oxide having an average particle size between 50 and 150 microns.

4. The process of claim 1 wherein said oxygen compound of metals is magnesium oxide having an average particle size between 50 and 150 microns.

5. The process of claim 1 wherein said oxygen compound of metals is aluminum hydroxide having an average particle size between 50 and 150 microns.

6. The process of claim 1 wherein from 0.1% to 3% by weight based on said monomers of said oxygen compounds of metals is employed.

7. The process of claim 1 wherein said oxygen compound of metals is fumed silica.

References Cited in the file of this patent

UNITED STATES PATENTS

| | | |
|---|---|---|
| 2,483,960 | Baer | Oct. 4, 1949 |
| 2,715,117 | Baeyaert | Aug. 9, 1955 |
| 3,057,831 | Holdsworth | Oct. 9, 1962 |

OTHER REFERENCES

Schildknecht: "Polymer Processes, Interscience" (1956). pages 69–109.